(12) United States Patent
Yoshikawa et al.

(10) Patent No.: US 6,553,960 B1
(45) Date of Patent: Apr. 29, 2003

(54) COMBUSTION SYSTEM FOR DIRECT INJECTION DIESEL ENGINES

(75) Inventors: Sigeru Yoshikawa, Osaka (JP); Seita Akimoto, Osaka (JP); Shunji Hamaoka, Osaka (JP)

(73) Assignee: Yanmar Co., Ltd. (JP)

( * ) Notice: Subject to any disclaimer, the term of this patent is extended or adjusted under 35 U.S.C. 154(b) by 0 days.

(21) Appl. No.: 09/806,081

(22) PCT Filed: Oct. 5, 1998

(86) PCT No.: PCT/JP98/04502

§ 371 (c)(1),
(2), (4) Date: Apr. 9, 2001

(87) PCT Pub. No.: WO00/20735

PCT Pub. Date: Apr. 13, 2000

(51) Int. Cl.$^7$ ................................................. F02B 3/00
(52) U.S. Cl. ........................ 123/299; 123/295; 123/261; 123/276
(58) Field of Search ................. 123/295, 296, 123/298, 299, 300, 261, 276

(56) References Cited

U.S. PATENT DOCUMENTS

| | | | | |
|---|---|---|---|---|
| 1,498,273 A | * | 6/1924 | Hesselman | 123/276 |
| 4,548,172 A | * | 10/1985 | Bailey | 123/298 |
| 4,721,081 A | * | 1/1988 | Krauja et al. | 123/298 |

FOREIGN PATENT DOCUMENTS

| | | |
|---|---|---|
| JP | 43-20403 | 9/1968 |
| JP | 60-93115 | 5/1985 |
| JP | 61-29940 | 9/1986 |
| JP | 1-88027 | 6/1989 |
| JP | 3-149315 | 6/1991 |
| JP | 4-31651 | 2/1992 |
| JP | 8-21245 | 1/1996 |
| JP | 8-200186 | 8/1996 |

* cited by examiner

Primary Examiner—Tony M. Argenbright
Assistant Examiner—Johnny H. Hoang
(74) Attorney, Agent, or Firm—Sterne, Kessler, Goldstein & Fox P.L.L.C.

(57) ABSTRACT

A combustion system for direct injection diesel engines, having a fuel injection nozzle provided with upper and lower rows of nozzle holes and disposed so as to be opposed to a deep dish combustion chamber of a small opening ratio. The directions of the upper nozzle holes (1) in the upper row and those of the lower nozzle holes (2) in the lower row are set so that fuel injected from the upper nozzle holes (1) reaches a side wall of the combustion chamber and fuel injected from the lower nozzle holes (2) impinges upon a bottom surface (4) of the combustion chamber. A ratio of a fuel spray travel from the upper nozzle holes (1) to a diameter of each of the upper nozzle holes is set to 150–250. The number of said upper nozzle holes (1) is set twice as large as that of said lower nozzle holes (2).

2 Claims, 4 Drawing Sheets

COMBUSTION SYSTEM FOR DIRECT INJECTION DIESEL ENGINES

BACKGROUND OF THE INVENTION

1. Field of the Invention

The present invention relates to a combustion system for direct fuel injection diesel engines, and more particularly, wherein a combustion chamber bored into a head of a piston is shaped like a deep dish of a small opening ratio and a fuel injection nozzle is provided with upper and lower rows of nozzle holes, thereby synthetically and simultaneously attaining both reduction of NOx and black smoke in exhaust gas and reduction of fuel expenses.

2. Background Art

Conventional direct fuel injection diesel engines generally have shallow dish combustion chambers formed in the heads of pistons. Such a combustion chamber has a great opening ratio because its peripheral edge is considerably close to the outer periphery end of the piston. Therefore, the travel of fuel from nozzle holes of a fuel nozzle facing the combustion chamber to the side wall of the combustion chamber becomes large so that the injected fuel is completely sprayed with almost no air stream, thereby increasing the coefficient of air-utilization, then burnt.

Furthermore, Japanese Utility Model Sho. 61-29940, for example, discloses a fuel injection nozzle provided with upper and lower nozzle holes in zigzags arranged radially around the axis of the fuel injection nozzle. In this art, the combustion chamber is vertically stepped so that fuel is injected from the upper nozzle holes toward the wall of the upper combustion chamber, and from the lower nozzle holes toward the wall of the lower combustion chamber, respectively.

However, the above art is only intended to increase the coefficient of air-utilization for improvement in fuel efficiency. The fuel spray travel from the upper nozzle holes to the wall of the upper combustion chamber is substantially as large as that the lower nozzle holes to the wall of the lower combustion chamber for an attempt of even combustion.

Japanese Utility Model Sho. 43-20403 discloses the lower nozzle holes are reduced in the diameters thereof and the number thereof. This document of the conventional art does not disclose a combustion chamber of a piston. However, the angle of the lower nozzle hole with the axis of the fuel injection nozzle (the nozzle hole angle β in the document) is comparatively large. Also, there is an account that the complete fuel combustion, which cannot be compensated only by improvement of air stream, is attained by distribution of fuel injection in consideration of the shape of combustion chamber at a final period of compression. Thus, presumably, the target of fuel sprayed from at least the lower nozzle holes is the edge of outer wall of the combustion chamber so as to supply the fuel spray into the piston combustion chamber even at the final period of compression. Perhaps, the unshown bottom central portion of the combustion chamber projects upwardly so as not to be provided for combustion. However, if the bottom of the combustion chamber is flat, it may be to say that air is insufficiently utilized around the central portion of the chamber bottom.

A deep dish combustion chamber is disadvantageous in that the air in the peripheral portion of the piston is not efficiently utilized. Even if the conventional fuel injection nozzle having upper and lower rows of nozzle holes is used, the air about the center portion of the combustion chamber is not effectively utilized because the lower nozzle holes to the side wall of the combustion chamber for fuel injection. If the air in such portions is sufficiently utilized, the combustion efficiency may be improved to reduce fuel expenses.

BRIEF SUMMARY OF THE INVENTION

In a direct injection diesel engine according to the present invention, for the purpose of simultaneous attainment of the two antinomic requirements, that is, reduction of fuel expenses and reduction of NOx, black smoke and the like in exhaust gas (exhaust emission), a piston is formed at its head with a deep dish combustion chamber of a small opening ratio. A fuel injection nozzle is provided with a pair of zigzagged upper and lower rows of nozzle holes. The direction of the nozzle holes in the upper row is set so that fuel injected therefrom reaches a side wall of the combustion chamber. A ratio of a fuel spray travel therefrom to a diameter of each of the nozzle holes in the upper row is set to 150–250. The direction of the nozzle holes in the lower row is set so that fuel injected therefrom impinges upon a bottom surface of the combustion chamber. A ratio of a fuel spray travel therefrom to a diameter of each of the nozzle holes in the lower row is set to 100–180. A ratio of a total area of all the nozzle holes in the lower row to that of all the nozzle holes in both the upper and lower rows is set to 0.25–0.35. The number of the nozzle holes in the upper row is set twice as large as that of the nozzle holes in the lower row.

Since fuel is injected from the fuel injection nozzle formed with such nozzle holes to the above-mentioned deep dish combustion chamber, 65–75% of fuel injected from the total area of all the nozzle holes is burnt in the vicinity of the vertical wall of the combustion chamber with a slight swirl, spurt and reverse spurt. The remaining 25–35% injected fuel directly impinges upon the wall (bottom surface) to be spread into minute particles and burnt. The fuel from the nozzle holes in the upper row is spread while moving up the vertical wall so as to be burnt with the air along the periphery of the piston. On the other hand, the fuel from the nozzle holes in the lower row is also spread to the vicinity of the central portion of the combustion chamber because of its impingement against the bottom surface. Therefore, the air in the whole combustion chamber is effectively used so as to improve efficiency of combustion and reduce fuel expenses.

Thus, according to the combustion system for direct injection diesel engines of the present invention, two kinds of combustion are simultaneously performed in one combustion chamber, thereby synthetically and simultaneously attaining both reduction of exhaust emission and reduction of fuel expenses.

The above-mentioned fuel injection nozzle is further constructed such that both extension lines of axes of any adjacent two of the nozzle holes in the upper row form the same angle on the axis of the fuel injection nozzle, and both extension lines of axes of any adjacent two of the nozzle holes in the lower row form the same angle on the axis of the fuel injection nozzle. Therefore, when viewed in plan, fuel is equally injected from all the nozzle holes in the upper row and from all the nozzle holes in the lower row respectively. The combustions by sprays from all the nozzle holes in the respective upper and lower rows are equalized, thereby improving efficiency of combustion and reducing fuel expenses.

BRIEF DESCRIPTION OF THE DRAWINGS/ FIGURES

DETAILED DESCRIPTION OF THE INVENTION

Figure 1:
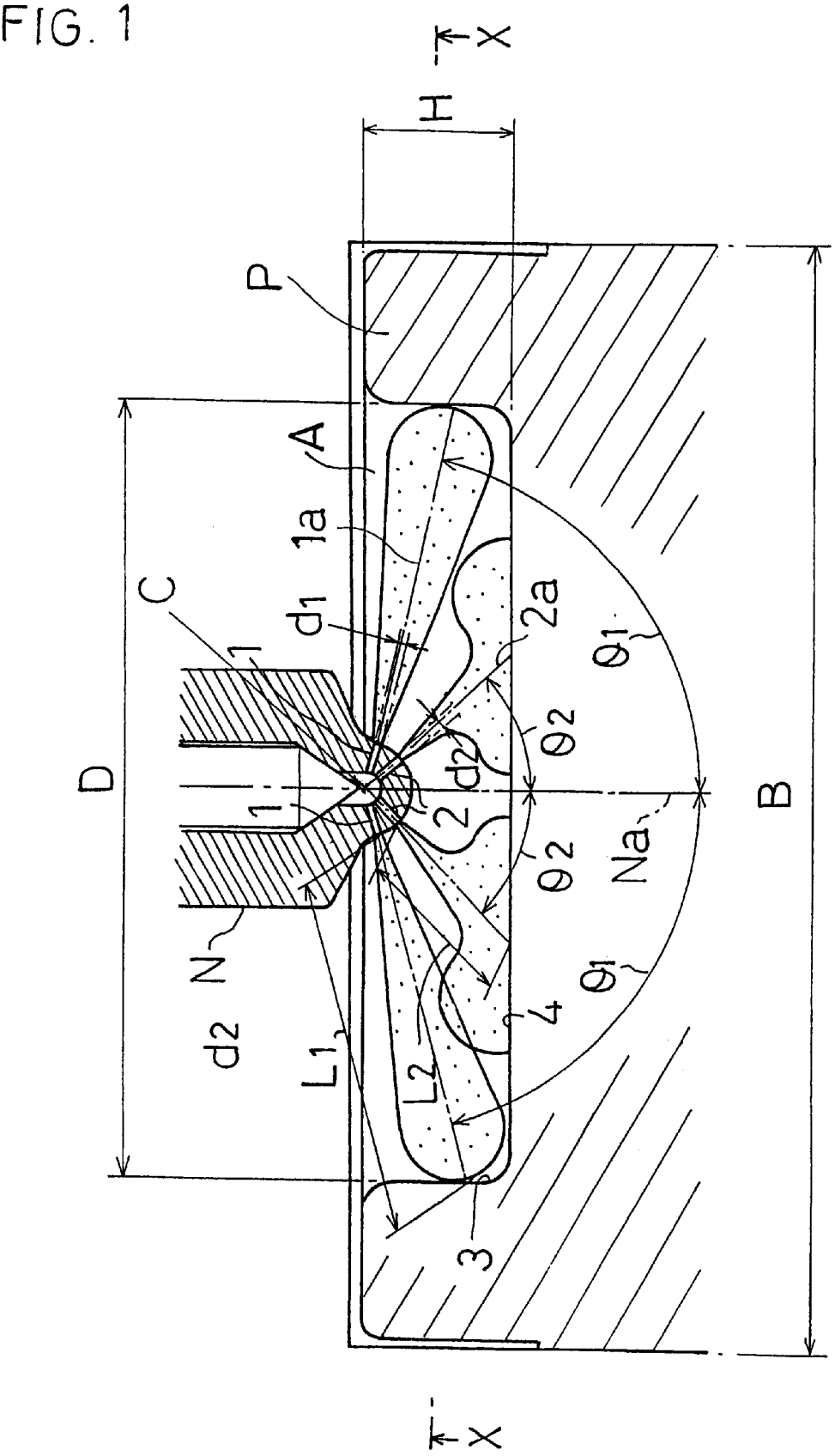
FIG. 1 is a sectional side view of a combustion system for direct injection diesel engines during injection according to the present invention.

Description will be given of a fuel injection nozzle structure for diesel engines shown in FIGS. 1 and 2 according to the present invention, compared with a conventional fuel injection nozzle structure for diesel engines shown in FIGS. 3 and 4.

A piston P is formed into its central head surface with a cylindrical deep dish combustion chamber A which is laterally long in a side view and circular in a plan view.

Figure 3:
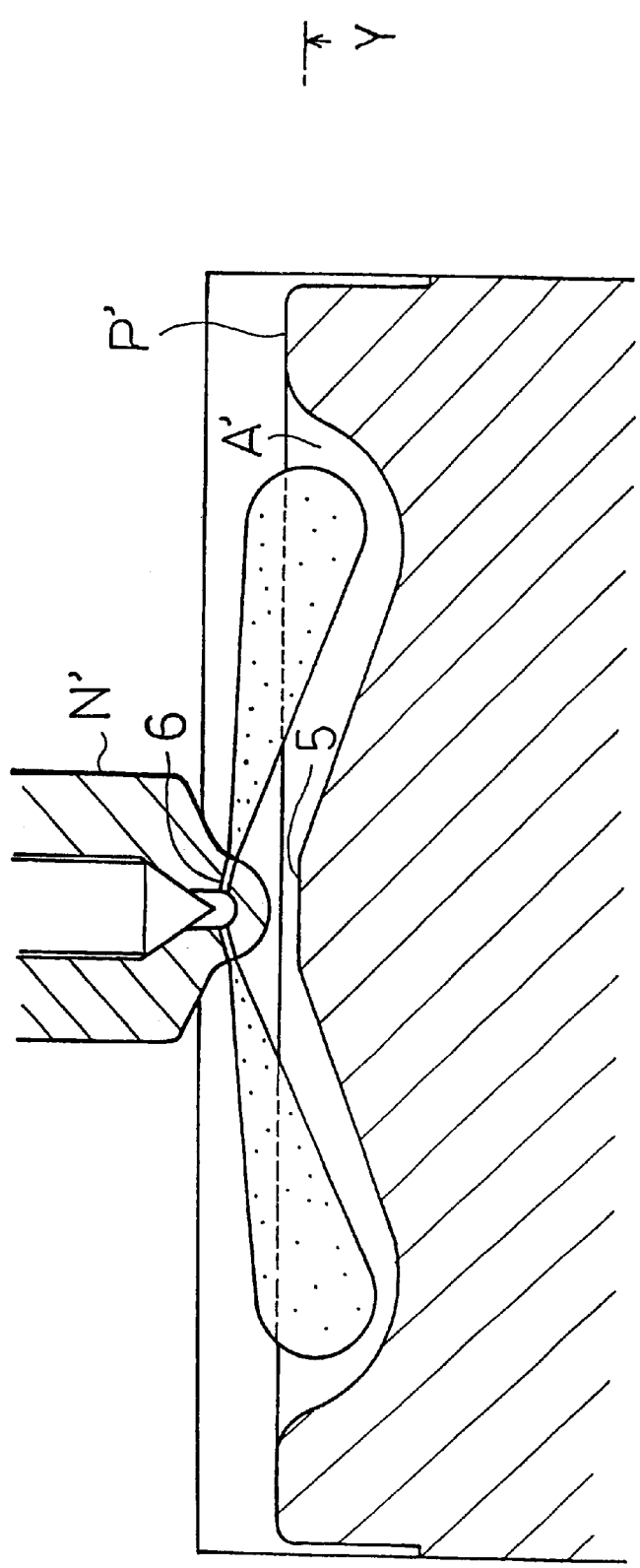
FIG. 3 is a sectional side view of a conventional combustion system for direct injection diesel engines during injection.

Conventionally, as shown in FIG. 3, a combustion chamber A' in the head portion of a piston P' is provided at its central bottom portion with an upward convex 5. In the present invention, such a central convex is removed to make a bottom surface 4 flat, thereby forming the combustion chamber A in a shape of deep dish.

Piston P has an outer diameter B (nearly equal to a cylinder bore diameter), and deep dish combustion chamber A provided in piston P has an inner diameter D and a depth H. The dimensions of combustion chamber A are set as follows:

$$H/D < 0.25$$

The opening ratio of combustion chamber D/B is set as follows:

$$0.6 < D/B < 0.7$$

As shown in FIG. 3, the peripheral edge of conventional combustion chamber A' comes adjacent to the outer periphery of piston P' so that the opening ratio of the combustion chamber A' is larger. Comparatively, deep dish combustion chamber A of the present invention has such a smaller opening ratio.

On the other hand, fuel injection nozzle N is provided with upper and lower rows of nozzle holes. The number of upper nozzle holes 1 forming the upper row of nozzle holes is set twice as large as that of lower nozzle holes 2 forming the lower row of nozzle holes. In this embodiment, eight upper nozzle holes 1 and four lower nozzle holes 2, which are half as many as upper nozzle holes 1, are provided.

As for an arrangement of the upper and lower rows of nozzle holes, each upper nozzle hole 1 and each lower nozzle hole 2 do not overlap vertically, that is, they are arranged in zigzags.

Figure 2:
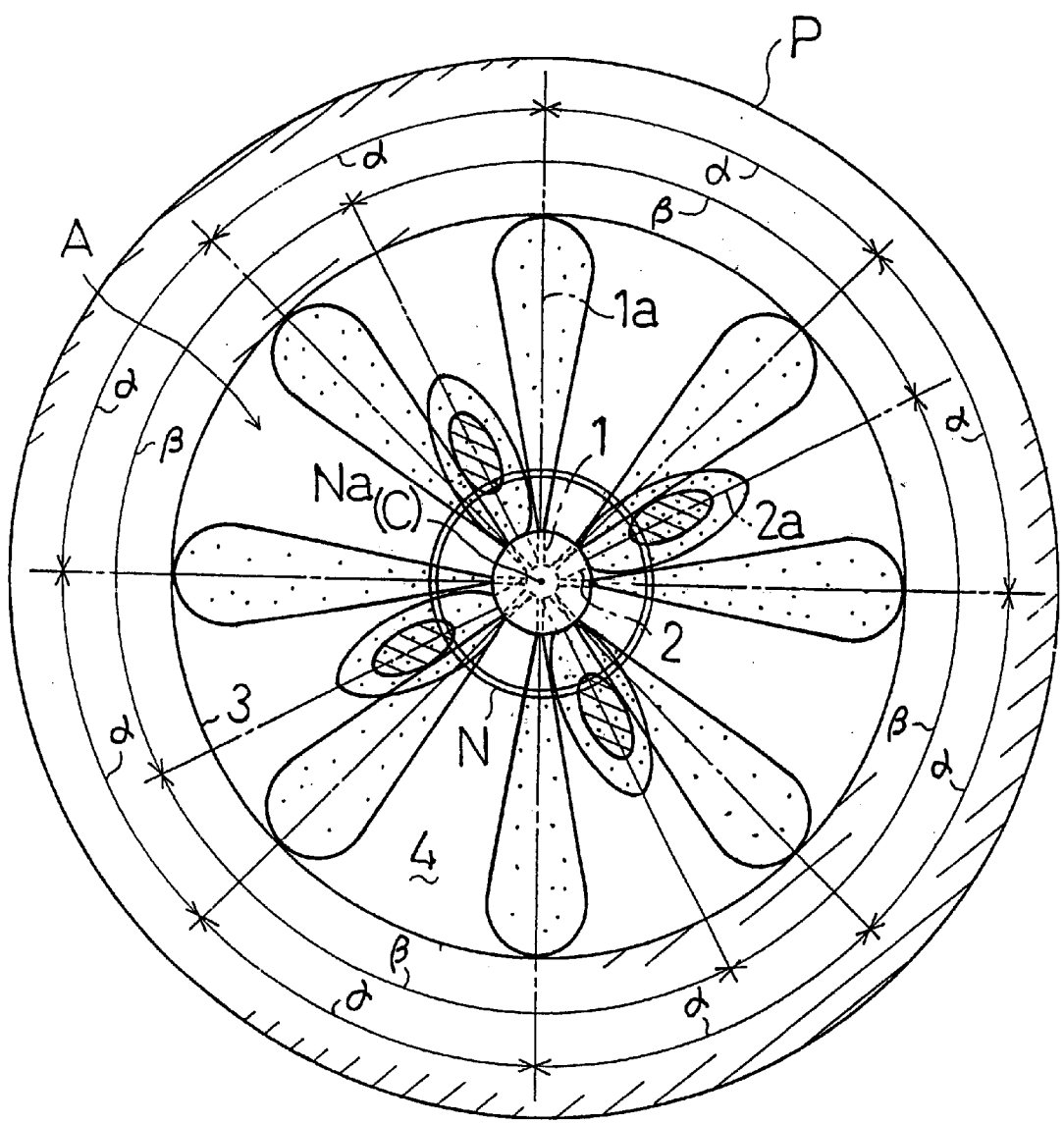
FIG. 2 is a cross-sectional view taken along X—X lines in FIG. 1.

Regarding this zigzag arrangement, as shown in FIG. 2, when viewed in plan, lower nozzle holes 2 may not be disposed in the exact middle between adjacent two upper nozzle holes 1. They are only required to be within the range between adjacent two upper nozzle holes 1.

Nozzle holes 1 and 2 are set so that the fuel injected from each upper nozzle hole 1 is oriented to a side wall 3 of a deep dish combustion chamber A and the fuel injected from each lower nozzle hole 2 impinges upon the bottom surface 4 of the deep dish combustion chamber A.

Figure 4:
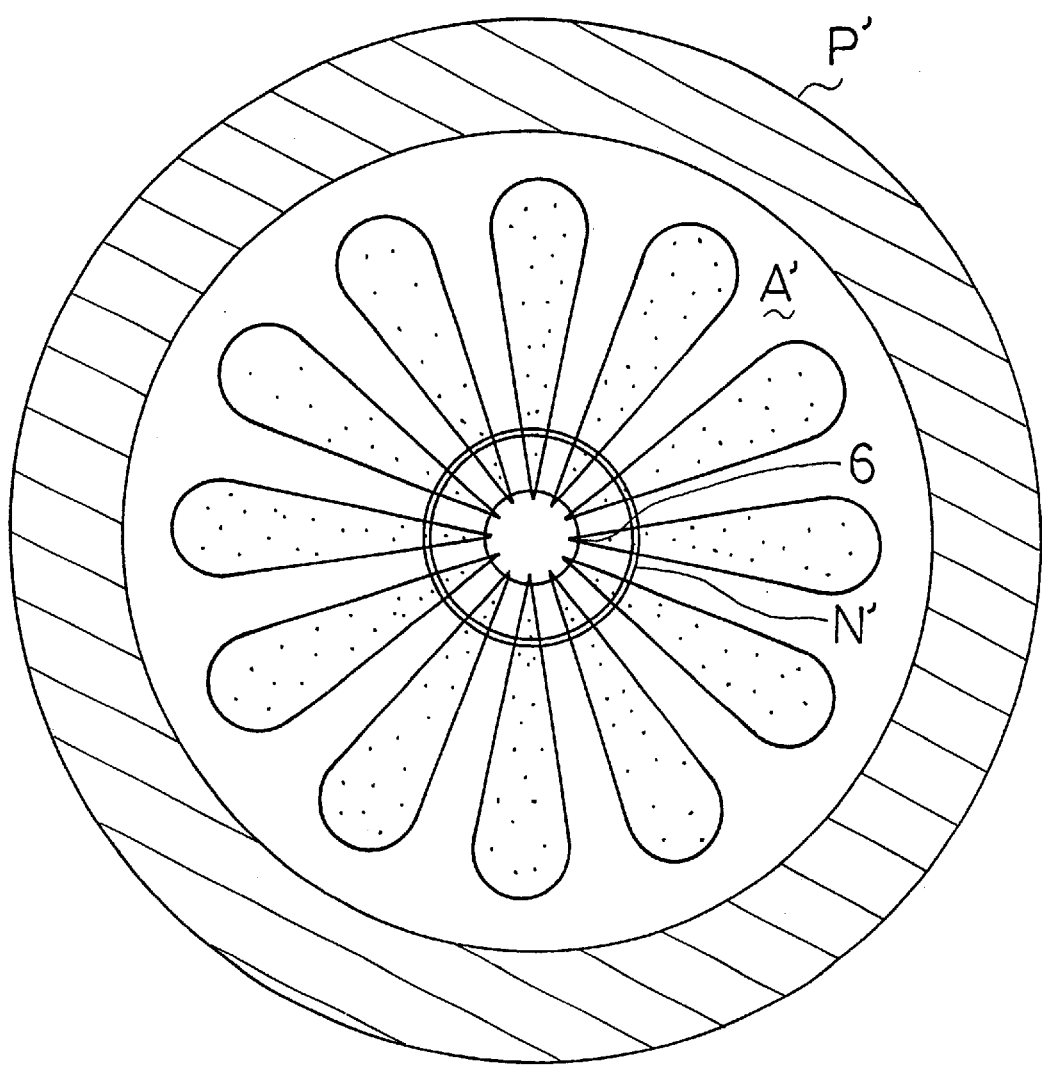
FIG. 4 is a cross-sectional view taken along Y—Y lines in FIG. 3.

Nozzle holes 6 of the conventional fuel injection nozzle N' shown in FIGS. 3 and 4 are set so that the fuel injected therefrom is oriented to a side wall of the combustion chamber A'. Combustion chamber A' is provided on its central bottom portion with convex 5 as described above. Nozzle holes 6 is not set to inject fuel to this central bottom portion. Furthermore, fuel injected from nozzle holes 6 does not impinge upon the side wall of the combustion chamber A' but it is completely sprayed until it reaches the side wall.

Each upper nozzle hole 1 has an axial line 1a forming an angle (a nozzle hole axis angle) θ1 with an axial line Na of the fuel injection nozzle N (or piston P). Each lower nozzle hole 2 has an axial line 2a forming an angle (a nozzle hole axis angle) θ2 with the axial line Na. Nozzle hole axis angles θ1 of all upper nozzle holes 1 in the upper row may not be the same but may have the fluctuation of degrees between −5 and +5. The same is true in nozzle hole axis angles θ2 of the lower nozzle holes 2.

An average "θ1 mean" of nozzle hole axis angle θ1 of all upper nozzle holes 1 in the upper row and an average "θ2 mean" of nozzle of all lower nozzle holes 2 in the lower row are as follows:

$$105° < θ1\ means - θ2\ means < 30°$$

All axial lines 1a of nozzle holes 1 in the upper row, if being extended inwardly, cross together at one point on the axial line Na of the fuel injection nozzle N (or piston P). This cross point is referred to as an extension center of nozzle holes. The same is true in all axial lines 2a of nozzle holes 2 in the lower row, if being extended inwardly. In this embodiment, both the extension centers of nozzle holes 1 and 2 coincide with a common extension center C1 as shown in FIG. 1. However, both the extension centers may be vertically offset from each other.

A spray travel L1 from the upper row of nozzle holes 1 to side wall 3 of deep dish combustion chamber A, a spray travel L2 from the lower row of nozzle holes 2 to bottom surface 4, a diameter d1 of each upper nozzle hole 1 and a diameter d2 of each lower nozzle hole 2 are set as follows:

$$150 \leq L1/d1 \leq 250$$

$$100 \leq L2/d2 \leq 180$$

A ratio of a total area of all lower nozzle holes 2 to that of all nozzle holes 1 and 2 is set to 0.25–0.35.

Consequently, fuel injected from upper nozzle holes 1 which spaces 65–75% of the total area of all nozzle holes 1 and 2 is burnt in vicinity of side wall 3 with a slight swirl, spurt and reverse spurt to move up the side wall 3 while the air along the periphery of piston P is also utilized. Remaining fuel of 25–35% injected from lower nozzle holes 2 directly impinges upon the bottom surface 4 to be spread into minute particles and burnt with the air around the central portion of the bottom surface 4.

In such a manner, since the limited amount of air in the combustion chamber A is utilized efficiently as much as possible, the reduction of exhaust emission and reduction of fuel expenses, which are antithetical to each other, can be synthetically and simultaneously attained.

Incidentally, upper nozzle holes 1 are arranged at regular intervals, and the same is true in lower nozzle holes 2. Thus, in this embodiment, as shown in FIG.2, an angle α between axes 1a (on extension center C) of any adjacent two of eight upper nozzle holes 1 is set to 45° (=360/8). An angle β between axes 2a of any adjacent two of four lower nozzle holes 2 is set to 90° (=360/4).

Due to this arrangement, with respect to the entire periphery of the deep dish combustion chamber A, fuel is evenly injected from the upper row of nozzle holes and from the lower row of nozzle holes, respectively. Therefore, even combustion is established in the whole space of the combustion chamber A, thereby improving the combustion efficiency and reducing fuel expenses.

Possibility of Industrial Application

The combustion system according to the present invention enables high-pressured fuel injection at the low cost because of its deep dish combustion chamber, even if the system is adapted to a large size direct injection diesel engine having diametrically large cylinders. Therefore, the present system is applicable to direct injection diesel engines requiring low fuel expenses and low emission in exhaust gas, regardless of the diameter size of cylinder.

What is claimed is:

1. A combustion system for direct injection diesel engines, comprising:

a deep dish combustion chamber of a small opening ratio;

a fuel injection nozzle disposed so as to be opposed to said deep dish combustion chamber;

a first number of upper nozzle holes, having a first direction, forming an upper row of nozzle holes provided in said fuel injection nozzle; and a second number of lower nozzle holes, having a second direction, forming a lower row of nozzle holes provided in said fuel injection nozzle, wherein said first direction of said upper nozzle holes is set so that fuel injected from said upper nozzle holes impinges upon a bottom of said combustion chamber, wherein said second direction of said lower nozzle holes is set so that fuel injected from said lower nozzle holes impinges upon a bottom of said combustion chamber, wherein a ratio of a first fuel spay travel from said upper nozzle holes to a diameter of each of said upper nozzle holes is set to 150–250, wherein a ratio of a second fuel spray travel from said lower nozzle holes to a diameter of each of said lower nozzle holes is set to 100–180, wherein a ratio of a total area of all lower nozzle holes to that of all of said upper and lower nozzle holes is set to 0.25–0.35, and wherein said first number of upper nozzle holes is set twice as large as said second number of lower nozzle holes.

2. A combustion system for direct injection diesel engines according to claim 1, wherein said upper and lower nozzle holes are arranged at regular intervals in said respective upper and lower rows.

* * * * *

UNITED STATES PATENT AND TRADEMARK OFFICE
CERTIFICATE OF CORRECTION

PATENT NO. : 6,553,960 B1
DATED : April 29, 2003
INVENTOR(S) : Sigeru Yoshikawa, Seita Akimoto and Shunji Hamaoka It is certified that error appears in the above-identified patent and that said Letters Patent is hereby corrected as shown below:

Column 2,
Line 2, insert -- point -- after the word "holes";

Column 5,
Line 7, delete "the"; and

Column 6,
Line 7, delete "spay" and insert -- spray --.

Signed and Sealed this

Twenty-eighth Day of October, 2003

JAMES E. ROGAN
*Director of the United States Patent and Trademark Office*